US008027834B2

(12) United States Patent
Hancock

(10) Patent No.: US 8,027,834 B2
(45) Date of Patent: Sep. 27, 2011

(54) TECHNIQUE FOR TRAINING A PHONETIC DECISION TREE WITH LIMITED PHONETIC EXCEPTIONAL TERMS

(75) Inventor: Steven M. Hancock, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 948 days.

(21) Appl. No.: 11/767,751

(22) Filed: Jun. 25, 2007

(65) Prior Publication Data

US 2008/0319753 A1 Dec. 25, 2008

(51) Int. Cl.
*G10L 15/04* (2006.01)

(52) U.S. Cl. ......................... 704/254; 704/258; 704/242

(58) Field of Classification Search ........... 704/230–269
See application file for complete search history.

(56) References Cited

U.S. PATENT DOCUMENTS

| | | | | |
|---|---|---|---|---|
| 4,692,941 | A * | 9/1987 | Jacks et al. | 704/260 |
| 5,652,829 | A | 7/1997 | Hong | |
| 5,787,274 | A | 7/1998 | Agrawal et al. | |
| 5,870,735 | A | 2/1999 | Agrawal et al. | |
| 6,119,085 | A * | 9/2000 | Lewis et al. | 704/260 |
| 6,138,115 | A | 10/2000 | Agrawal et al. | |
| 6,363,342 | B2 * | 3/2002 | Shaw et al. | 704/220 |
| 6,411,932 | B1 * | 6/2002 | Molnar et al. | 704/260 |
| 6,889,219 | B2 * | 5/2005 | Epstein et al. | 706/45 |
| 6,993,535 | B2 | 1/2006 | Bolle et al. | |
| 7,016,887 | B2 | 3/2006 | Stockfisch | |
| 7,356,468 | B2 * | 4/2008 | Webster | 704/258 |
| 7,467,087 | B1 * | 12/2008 | Gillick et al. | 704/260 |
| 2004/0034524 | A1 * | 2/2004 | Rajput et al. | 704/9 |
| 2005/0192807 | A1 * | 9/2005 | Emam et al. | 704/260 |
| 2007/0255567 | A1 * | 11/2007 | Bangalore et al. | 704/260 |

OTHER PUBLICATIONS

Schiavone, G.A., et al., "Terrain Database Interoperability Issues in Training With Distributed Interactive Simulation," ACM Transactions on Modeling and Computer Simulation, vol. 7, No. 3, pp. 332-367, Jul. 1997.
Murthy, S.K., "Automatic Construction of Decision Trees from Data: A Multi-Disciplinary Survey," Data Mining and Knowledge Discovery, vol. 2, No. 4, pp. 345-389, 1998.
Rokach, L, et al., "Feature Set Decomposition for Decision Trees," Intelligent Data Analysis, vol. 9, pp. 131-158, 2005.

* cited by examiner

*Primary Examiner* — Abul K Azad
(74) *Attorney, Agent, or Firm* — Wolf, Greenfield & Sacks, P.C.

(57) ABSTRACT

The present invention discloses a method for training an exception-limited phonetic decision tree. An initial subset of data can be selected and used for creating an initial phonetic decision tree. Additional terms can then be incorporated into the subset. The enlarged subset can be used to evaluate the phonetic decision tree with the results being categorized as either correctly or incorrectly phonetized. An exception-limited phonetic tree can be generated from the set of correctly phonetized terms. If the termination conditions for the method have been determined to be unsatisfactorily met, then steps of the method can be repeated.

23 Claims, 3 Drawing Sheets

100

TECHNIQUE FOR TRAINING A PHONETIC DECISION TREE WITH LIMITED PHONETIC EXCEPTIONAL TERMS

BACKGROUND

1. Field of the Invention

The present invention relates to the field of text to speech processing and, more particularly, to training a phonetic decision tree with limited phonetic exceptions for a text-to-speech system.

2. Description of the Related Art

Text-to-speech (TTS) systems are an integral component of speech processing systems. Conventional TTS systems utilize a phonetic decision tree when synthesizing the words contained in an input text string into speech output. These phonetic trees are typically created using a very sizable set of randomly selected words called the training data; the set often contains tens or hundreds of thousands of words. The accuracy of the phonetic tree is then evaluated using test data, which is another set of random words.

Due to phonetic inconsistencies inherent within written languages, these phonetic trees often include extraneous branches to handle such exceptional words. For example, the word "some" is pronounced as "sum" and not with a long 'o' as with other phonetically similar words such as "home" and "dome". When the randomly selected training data contains a large quantity of these phonetically exceptional words, the phonetic tree contains as many extraneous branches. These extraneous branches increase the processing time required by the TTS system to produce the speech output. Additionally, the larger size of the phonetic tree requires more storage space within the system.

Reducing the quantity of phonetic exceptions in the training data would help to streamline the phonetic tree. However, the voluminous size of the training data inhibits the use of a manual process to eliminate phonetic exceptions. An automated process currently does not exist for creating a phonetic tree that is not influenced by phonetic exceptions.

What is needed is an automated solution that creates a phonetic tree without the influence of phonetic exceptions. That is, the solution would use an automated process to remove the influence of phonetic exceptions on the phonetic tree. Ideally, such a solution would result in the creation of a phonetic tree containing only standard phonetic translations. Additionally, this solution can utilize an exception dictionary to phonetize words containing phonetic exceptions.

SUMMARY OF THE INVENTION

The present invention discloses a technique for training a phonetic decision tree with limited exposure to phonetically exceptional terms. That is, the phonetic exceptions that exist within the data set used for training and evaluating the phonetic decision tree can be removed. Such a process can be performed in the development environment of a text-to-speech (TTS) system using a semi-automated method that allows for the predetermination of training data sets and termination conditions. The terms identified as phonetic exceptions can be collected and stored as an exception dictionary for use during runtime phonetization of such terms when encountered in a text input string.

The present invention can be implemented in accordance with numerous aspects consistent with the material presented herein. For example, one aspect of the present invention can include a method for training an exception-limited phonetic decision tree. An initial subset of data can be selected and used for creating an initial phonetic decision tree. Additional terms can then be incorporated into the subset. The enlarged subset can be used to evaluate the phonetic decision tree with the results being categorized as either correctly or incorrectly phonetized. An exception-limited phonetic tree can be generated from the set of correctly phonetized terms. If the termination conditions for the method have been determined to be unsatisfactorily met, then steps of the method can be repeated.

Another aspect of the present invention can include a system for training an exception-limited phonetic tree. The system can include a training data set, a training engine, and a phonetic tree generation engine. The training engine can be configured to evaluate the phonetic tree using the training data set and a set of standard pronunciations to categorize the results based on accuracy. The phonetic tree generation engine can be configured to create an exception-limited phonetic tree from terms categorized as correctly phonetized.

Still another aspect of the present invention can include a method for creating a phonetic tree for speech synthesis. The method can include a step of generating an initial phonetic tree from a training data set of words and corresponding word pronunciations. Each word in the data set can be text-to-speech converted using the phonetic tree. Each text-to-speech converted word can be compared against a corresponding word pronunciation from the data set. Words can be removed from the training set that were not correctly text-to-speech converted using the phonetic tree. A new phonetic tree can be created using the modified training data set resulting from the removing step. The new phonetic tree can be either an intermediate tree used to produce a production tree after further processing or a production tree. A production tree can be a phonetic tree used by a speech synthesis engine to generate speech output from text input in a runtime environment.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
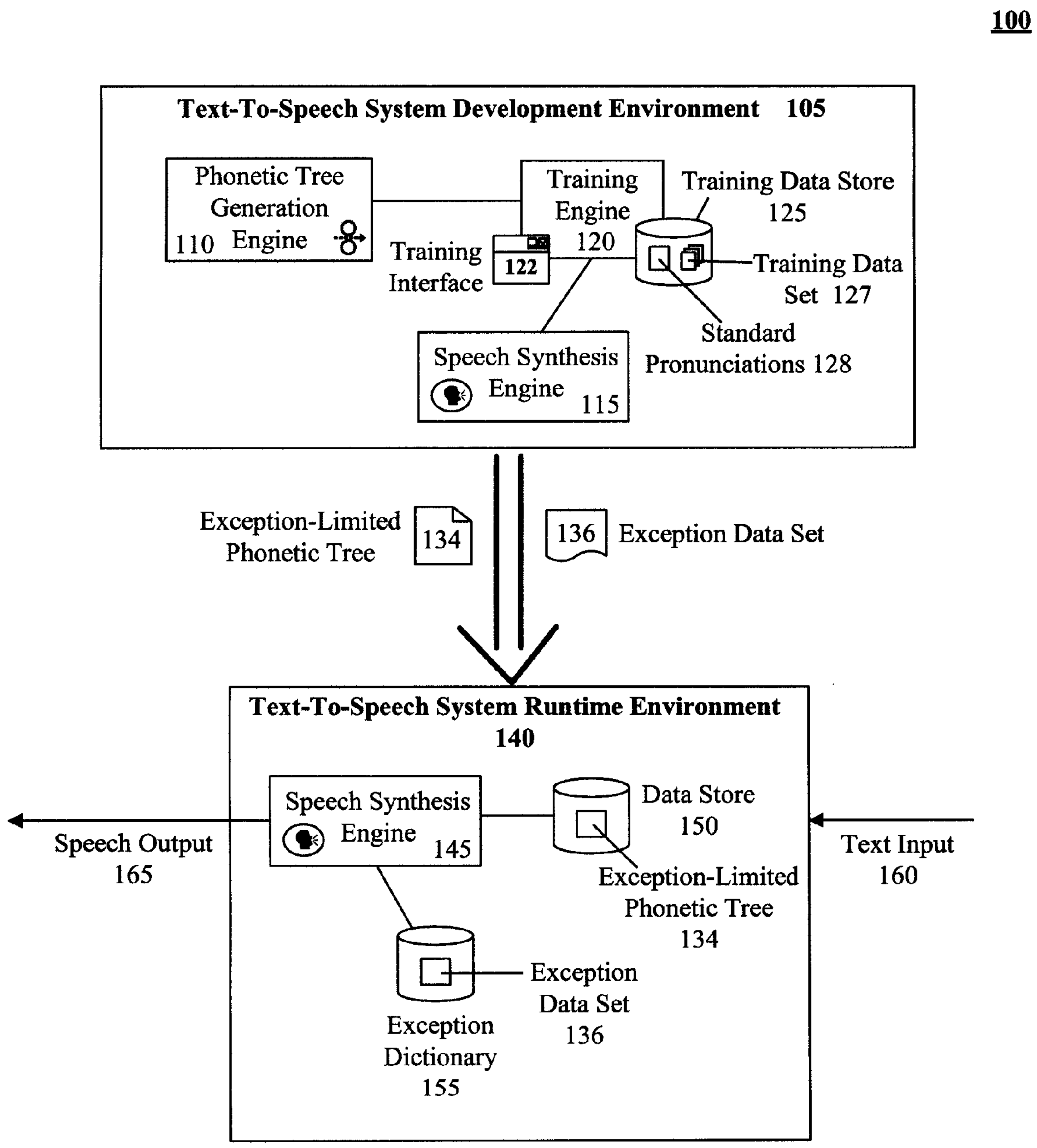
FIG. 1 is a schematic diagram of a system for training an exception-limited phonetic tree in a development environment for use in the runtime environment of a text-to-speech (TTS) system in accordance with embodiments of the inventive arrangements disclosed herein.

FIG. 1 is a schematic diagram of a system 100 for training an exception-limited phonetic tree 134 in a development environment 105 for use in the runtime environment 140 of a text-to-speech (TTS) system in accordance with embodiments of the inventive arrangements disclosed herein. In system 100, an exception-limited phonetic tree 134 can be generated within the development environment 105 of a TTS system.

The development environment 105 can be a system used for the creation and evaluation of components for the runtime environment 140 of a TTS system. It should be noted that such a development environment 105 can include a wide variety of components for various functions. As such, only components that are particularly relevant to the present invention have been included in this figure.

In this example, the TTS development environment 105 can include components for the selective training of a phonetic decision tree. These components can include a phonetic tree generation engine 110, a training engine 120, and a speech synthesis engine 115. The various phonetic trees used within the development environment 105, including the exception-limited phonetic tree 134, can be generated by the phonetic tree generation engine 110. The phonetic tree generation engine 110 can be a software component configured to generate a phonetic tree from a training data set 127.

The training engine 120 can be a component configured to provide a semi-automated mechanism by which to limit the amount of phonetic exceptions used in the training of the phonetic decision tree. It should be noted that such a mechanism is of particular significance because it overcomes the prohibitive issue of removing phonetic exceptions from large data sets to produce an exception-limited phonetic tree 134.

The training engine 120 can include a training interface 122 and can access a training data store 125. The training interface 122 can be mechanism by which a user can interact with the training engine 120. The training interface 122 can be implemented in a variety of ways, including, but not limited to, a graphical user interface (GUI), a command-line interface, a touch-screen interface, a voice command interface, and the like. Interactions performed with the training interface 122 can include, but are not limited to, grouping terms into one or more training data sets 127, defining one or more termination conditions, selecting a set of standard pronunciations 128 for use, and the like.

The training data store 125 can include training data sets 127 and a set of standard pronunciations 128. Training data sets 127 can be collections of terms to be used when evaluating the accuracy of a phonetic tree. A training data set 127 can represent a subset of terms available for a language. For example, a first data set 127 can represent the top 30% of most frequently used words in a language and a second data set 127 can contain the top 31-40% most frequently used words.

In another embodiment, the training data sets 127 can represent subsets of a larger pool of input data (not shown). In such an embodiment, the input data (not shown) can also be contained within the training data store 125.

When evaluating the accuracy of the phonetic tree, the training engine 120 can compare the phonetizations generated by the speech synthesis engine 120 against those contained within the set of standard pronunciations 128. The set of standard pronunciations 128 can include synthesized speech of the accepted pronunciations of terms contained within the training data sets 127.

The training process within the development environment 105 can produce an exception-limited phonetic tree 134 and an exception data set 136 that can be transferred to a runtime environment 140 of the TTS system. The exception-limited phonetic tree 134 can represent a phonetic decision tree created using a specific training process such that the tree 134 can contain fewer decision branches for words containing phonetic exceptions.

As used herein, the term "exception-limited" describes a phonetic tree with a minimal amount of branches allotted to handling terms containing phonetic exceptions. A phonetic exception occurs when a word exhibits a weak correspondence between its spelling and expected phonetic pronunciation. For example, the accepted pronunciation of phonetic portion "ough" is "uff" as in "rough", "tough", and "enough". Thus, other terms containing "ough" that do not comply with the expected pronunciation, such as "bough" and "through", are considered to be phonetic exceptions.

The exception data set 136 can represent the phonetic exceptions encountered during the training process of the exception-limited phonetic tree 134. These phonetic exceptions can exist within the training data sets 127 and the training engine 120 can group such words into the exception data set 136. For example, the word "bough" would be placed within the exception data set 136 when encountered by the training engine 120 within a training set 127.

The runtime environment 140 can be a system used for the synthesis of text input 160 into a corresponding speech output 165. It should be noted that the runtime environment 140 can include a wide variety of components for various functions, such as normalizing the text input 160. As with the development environment 105, only components of particular relevance to the present invention have been included in the runtime environment 140.

The speech synthesis engine 145 can be used by the runtime environment 140 to produce speech output 165 for the text input 160. The speech synthesis engine 145 can utilize the exception-limited phonetic tree 134 and exception data set 136, which were received from the development environment 105. The exception-limited phonetic tree 134 can be stored in a data store 150 that is accessible by the speech synthesis engine 145. Likewise, the exception data set 136 can be stored within an exception dictionary 155 that is also accessible by the speech synthesis engine 145.

The speech synthesis engine 145 can utilize the contents of the exception dictionary 155 to handle synthesis of phonetic exceptions within the text input 160. The speech synthesis engine 145 can synthesize speech for words within the text input 160 having standard pronunciations utilizing the exception-limited phonetic tree 134. The speech synthesis engine 145 can include an algorithm that determines whether the engine 145 should use the exception-limited phonetic tree 134 or the exception dictionary 155 for synthesis.

In another contemplated embodiment, the exception dictionary 155 can be utilized by a specialized exception handler (not shown) in the runtime environment 140 to handle phonetic exceptions within the text input 160.

As used herein, presented data stores, including stores 125, 150, and 155, can be a physical or virtual storage space configured to store digital information. Data stores 125, 150, and 155 can be physically implemented within any type of hardware including, but not limited to, a magnetic disk, an optical disk, a semiconductor memory, a digitally encoded plastic memory, or any other recording medium. Data stores 125, 150, and 155 can be a stand-alone storage unit as well as a storage unit formed from a plurality of physical devices. Additionally, information can be stored within data stores 125, 150, and 155 in a variety of manners. For example, information can be stored within a database structure or can be stored within one or more files of a file storage system, where each file may or may not be indexed for information searching purposes. Further, data stores 125, 150, and/or 155 can utilize one or more encryption mechanisms to protect stored information from unauthorized access.

Figure 2:
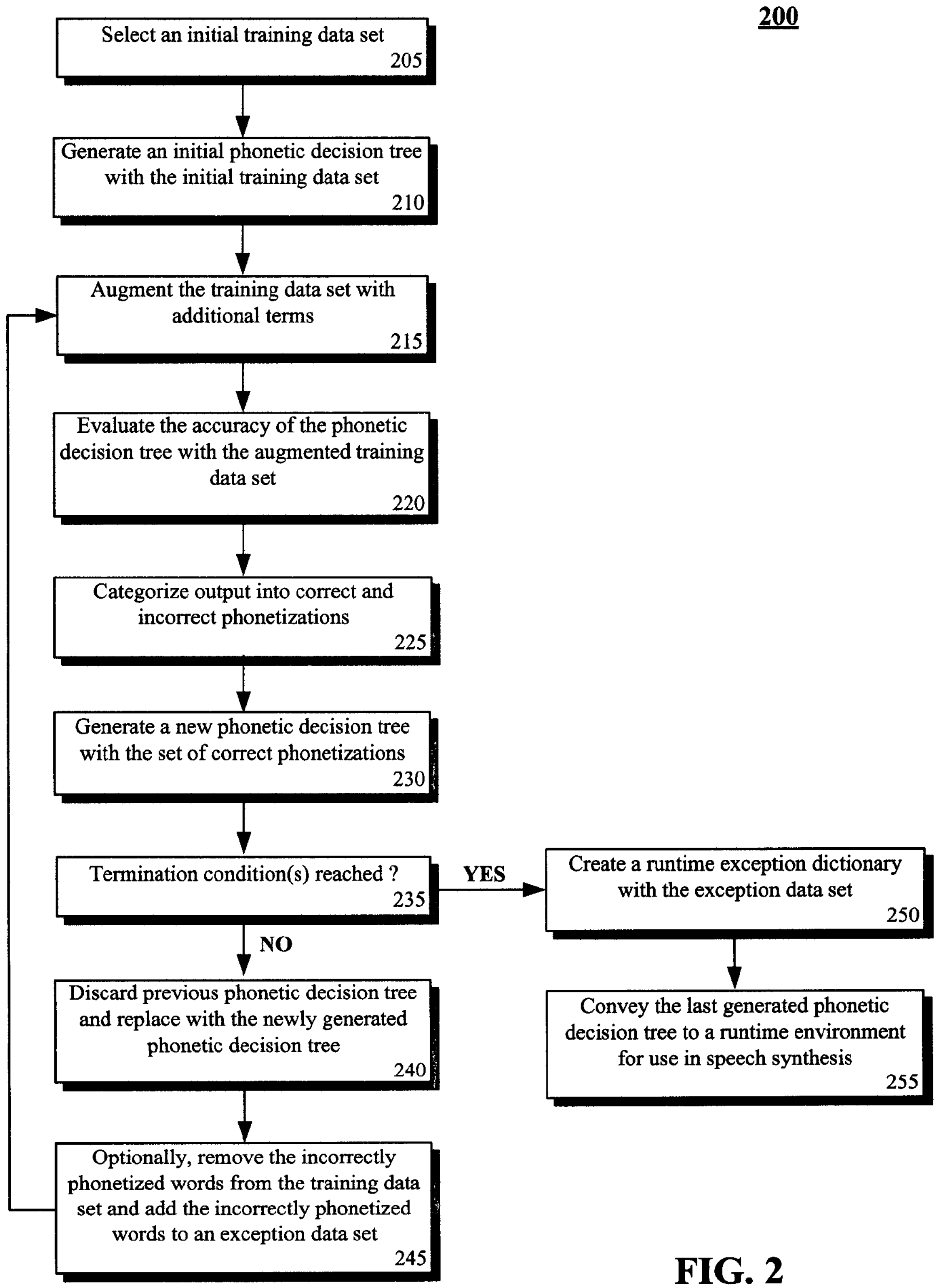
FIG. 2 is a flow diagram illustrating a method for training an exception-limited phonetic decision tree for use in a text-to-speech (TTS) system in accordance with an embodiment of the inventive arrangements disclosed herein.

FIG. 2 is a flow diagram illustrating a method 200 for training an exception-limited phonetic decision tree for use in a text-to-speech (TTS) system in accordance with an embodiment of the inventive arrangements disclosed herein. Method 200 can be performed within the context of system 100 or any other system capable of training an exception-limited phonetic decision tree.

Method 200 can begin with step 205 where an initial training data set can be selected. The initial training data set can be used to generate an initial phonetic decision tree in step 210. In step 215, the training data set can be augmented with additional terms. The additional terms used in step 215 can be contained within another training data set or a superset of data.

The accuracy of phonetic decision tree can be evaluated using the augmented training data set in step 220. In step 225, the output of step 220 can be categorized into correct and incorrect phonetizations. A new phonetic decision tree can be generated in step 230 with the correct phonetizations of step 225.

In step 235, the training engine can determine if one or more termination conditions have been met. For example, a simplistic termination condition can be to terminate method 200 after a set number of iterations.

When the termination condition(s) have not been met, step 240 can execute where the previous phonetic decision tree can be discarded from the process and can be replaced with the decision tree that was generated in step 230.

Optionally, step 245 can be performed in which the incorrect phonetizations from step 225 can be removed from the training data set and can be added to an exception data set. The flow of method 200 can then return to step 215.

When step 235 determines that the termination condition (s) have been satisfied, step 250 can execute in which a runtime exception dictionary can be created with the exception data set. In step 255, the last phonetic tree generated by method 200 can be conveyed to a runtime environment for use in speech synthesis.

Figure 3:
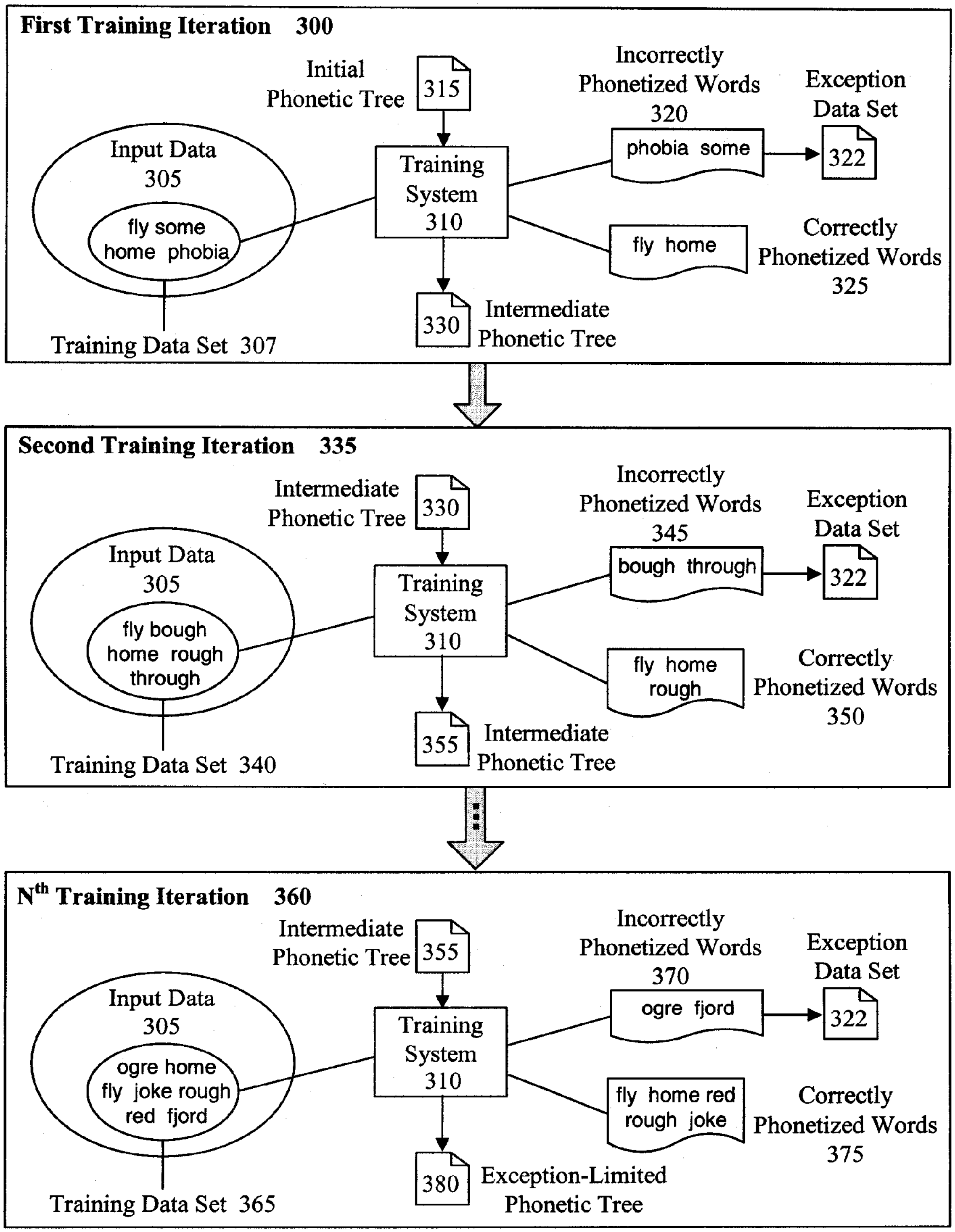
FIG. 3 details a set of sample training iterations for training an exception-limited phonetic tree in accordance with an embodiment of the inventive arrangements disclosed herein.

FIG. 3 details a set of sample training iterations 300, 335, and 360 for training an exception-limited phonetic tree in accordance with an embodiment of the inventive arrangements disclosed herein. It should be stressed that the samples shown in FIG. 3 are for illustrative purposes and are not intended to represent an absolute implementation or limitation to the present invention.

In the first training iteration 300, the training system 310 can receive a training data set 307 and an initial phonetic tree 315. The training system 310 can represent the processing components of a development environment used in the training of a phonetic tree, such as the training engine 120, phonetic tree generation engine 110, and speech synthesis engine 115 of system 100.

The initial phonetic tree 315 can be previously generated by the training system 310. As shown in this example, the training data set 307 can be a subset of a larger set of input data 305. The training data set 307 can include words such as "fly", "some", "home", and "phobia".

The training system 310 can determine if the initial phonetic tree 315 correctly phonetizes the words contained with the training data set 307. Words that the initial phonetic tree 315 correctly phonetizes can be placed in a set of correctly phonetized words 325.

Those incorrectly phonetized can be placed in a set of incorrectly phonetized words 320. In this example, the set of correctly phonetized words 325 contains the words "fly" and "home" and the set of incorrectly phonetized words 320 contains the words "phobia" and "some". The incorrectly phonetized words 320 can then be stored in an exception data set 322.

Once the initial phonetic tree 315 has been evaluated with the words of the training data set 307, the training system 310 can generate an intermediate phonetic tree 330 with the correctly phonetized words.

It should be noted that the use of the correctly phonetized words 325 to generate the intermediate phonetic tree 330 can remove existing branches for phonetizing phonetic exceptions from the initial phonetic tree 315. Such a process can then overcome any phonetic issues that were introduced during the creation of the initial phonetic tree 315.

The second training iteration 335 can perform a process similar to the first training iteration 300. In this iteration 335, the training system 310 evaluates the intermediate phonetic tree 330 from the previous iteration 300 with a modified training data set 340. As shown in this example, the training data set 340 contains those words that were correctly phonetized in the previous iteration 300 as well as additional terms. In this example, the training data set 340 contains the words "fly", "bough", "home", "rough", and "through".

In this example, the training system 310 places the words "fly", "home", and "rough" into the set of correctly phonetized words 350. The set of incorrectly phonetized words 345 contains the words "bough" and "through". The incorrectly phonetized words 345 can then be added to the exception data set 322. The second iteration 335 can finish with the generation of the intermediate phonetic tree 355.

Iterations of this process can continue until the $N^{th}$ iteration 360 is reached. The $N^{th}$ iteration 360 can be determined by the evaluation of one or more termination conditions by the training system 310. The training system 310 can evaluate the intermediate phonetic tree 355 from the previous iteration 335 with a modified training data set 365.

In this example, the training data set 365 contains those words that were correctly phonetized in the previous iteration 335 as well as the additional words "ogre", "joke", "red", and "fjord". Evaluation of the intermediate phonetic tree 355 can result in the training system 310 placing the words "fly", "home", "rough", "red", and "joke" into the set of correctly phonetized words 375 and "ogre" and "fjord" into the set of incorrectly phonetized words 370. The incorrectly phonetized words 370 can then be added to the exception data set 322.

The $N^{th}$ iteration 360 can conclude with the generation of the exception-limited phonetic tree 380 using the set of correctly phonetized words 375.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for testing a phonetic decision tree, the method comprising:

testing a first phonetic decision tree, created using a first set of data, with a second set of data, the second set of data including at least one second term not in the first set of data, by phonetizing terms of the second set of data using the first phonetic decision tree;

categorizing results of the testing into a set of correctly phonetized terms and a set of incorrectly phonetized terms; and operating at least one processor to create an exception dictionary including at least one term from the set of incorrectly phonetized terms and phonetization information related to the at least one term.

2. The method of claim 1, wherein the categorizing further comprises:

generating a phonetization corresponding to a term in the second set of data;

comparing the generated phonetization to a standard pronunciation of the term;

when the generated phonetization is equivalent to the standard pronunciation, classifying the term as correctly phonetized; and when the generated phonetization does not match the standard pronunciation, classifying the term as incorrectly phonetized.

3. The method of claim 2, wherein the generating the phonetization, comparing the generated phonetization, and classifying the term are repeated for each term contained within the first set of data.

4. The method of claim 2, wherein generating the phonetization comprises generating a speech output, and wherein comparing the generated phonetization to the standard pronunciation of the term comprises comparing the speech output to the standard pronunciation.

5. The method of claim 1, wherein the testing, categorizing, and creating are performed in a development environment of a text-to-speech (TTS) system.

6. The method of claim 1, further comprising:

using the exception dictionary by a speech synthesis engine in a runtime environment of a TTS system to produce a speech output corresponding to a term in the set of incorrectly phonetized terms.

7. The method of claim 1, wherein the testing, categorizing, and creating are performed by at least one machine in accordance with at least one computer program stored in a computer readable storage media, said computer programming having a plurality of code sections that are executable by the at least one machine.

8. The method of claim 1, wherein the accepting comprises:

following the categorizing, determining if one or more termination conditions are met by the first phonetic decision tree; and when the one or more termination conditions are met, accepting the first phonetic decision tree as a production decision tree to be used in the text-to-speech system.

9. The method of claim 8, further comprising:

when the one or more termination conditions are not met, repeating, until the one or more termination conditions are met, acts of creating a new phonetic decision tree using a new set of data including data not previously used to create a phonetic decision tree, following the expanding, testing the new phonetic decision tree with at least one third term not in the new set of data by phonetizing the at least one third term using the new phonetic decision tree, categorizing results of the testing into a set of correctly phonetized terms and a set of incorrectly phonetized terms, and determining if the one or more termination conditions are met by the new phonetic decision tree; and when the one or more termination conditions are met, accepting the new phonetic decision tree as the production decision tree to be used in the text-to-speech system.

10. The method of claim 9, further comprising:

following each categorizing during the repeating, removing from the new set of data terms categorized into the set of incorrectly phonetized terms, and wherein categorizing a result into the set of incorrectly categorized terms comprises adding the term to the set of incorrectly categorized terms.

11. The method of claim 9, further comprising, during the repeating:

prior to each creating of the new decision tree during the repeating, removing terms from the set of incorrectly categorized terms.

12. The method of claim 11, wherein creating the exception dictionary from the set of incorrectly phonetized terms comprises creating the exception dictionary comprising at least one term from the set of incorrectly phonetized terms from a last categorizing prior to determining that the one or more termination conditions are met.

13. A system for phonetic decision tree testing, the system comprising:

at least one recording device to store processor-executable instructions; and at least one processor coupled to the at least one recording device and programmed by the processor-executable instructions to act as:

a training engine configured to evaluate a phonetic decision tree, created using a first data set of terms of a training data set, using a second set of terms from the training data set and a set of standard pronunciations, the second set of terms comprising terms for evaluating the phonetic decision tree and including at least one second term not in the first data set, wherein the training engine categorizes a result of the evaluation into a set of correctly phonetized terms and a set of incorrectly phonetized terms, wherein the phonetic tree generation engine is configured to create an exception-limited phonetic decision tree from the set of correctly phonetized terms.

14. The system of claim 13, wherein the training engine further comprises:

a training interface configured to provide user-configuration of the training data set and one or more termination conditions.

15. The system of claim 13, wherein the phonetic tree generation engine is further configured to create an exception dictionary for use in the text to speech processing, the exception dictionary comprising at least one term of the set of incorrectly phonetized terms and pronunciation information related to the at least one term.

16. The system of claim 13, wherein the phonetic tree generation engine is configured to create an exception-limited phonetic decision tree by:

following the evaluation and the categorizing by the training engine, determining if one or more termination conditions are met by the phonetic decision tree; and when the one or more termination conditions are met, adopting the phonetic decision tree as the exception-limited phonetic decision tree.

17. The system of claim 16, wherein the phonetic tree generation engine is configured to, when the one or more termination conditions are not met by the phonetic decision tree, repeat, until the one or more termination conditions are met:

creating a new phonetic decision tree using a new data set including the first data set and an additional data set; and based on evaluation and categorizing of the new phonetic decision tree by the training engine, determine whether the one or more termination conditions are met by the new phonetic decision tree; and when the one or more termination conditions are met by the new phonetic decision tree, adopt the new phonetic decision tree as the exception-limited phonetic decision tree.

18. A method for creating a phonetic tree for speech synthesis comprising acts of:

generating an initial phonetic tree from a first training data set of terms and corresponding term pronunciations;

creating a second data set including at least one second term not in the first training data set;

creating at least one phonetization for at least one term in the second data set using the initial phonetic tree;

comparing a first phonetization of the at least one phonetization for a first term of the at least one term to a corresponding correct term pronunciation for the first term;

categorizing at least one result of the comparing into a set of correctly phonetized terms and a set of incorrectly phonetized terms; and creating an exception dictionary including at least one incorrectly-phonetized term of the set of incorrectly phonetized terms and phonetization information related to the at least one incorrectly-phonetized term.

19. The method of claim 18, further comprising:

determining whether a termination condition has been reached based at least in part on the categorizing, wherein the termination condition is based at least in part upon a number of terms categorized into the set of incorrectly phonetized terms;

when the termination condition has been reached, accepting the phonetic tree as a production tree to be used by a speech synthesis engine to generate speech output from text input; and when the termination condition has not been reached, repeating the generating, creating, creating, comparing to generate and evaluate a different phonetic tree until the termination condition is reached, and accepting the different phonetic tree as the production tree when the termination condition is created.

20. The method of claim 18, further comprising:

establishing a frequency list of words in a language sorted by frequency of use, and creating the training set from N percentage of words in the frequency list, wherein N is a configurable percentage.

21. The method of claim 18, further comprising:

using the exception dictionary of words at runtime, by the speech synthesis engine, in conjunction with a phonetic decision tree.

22. The method of claim 21, further comprising:

removing from the expanded data set those words that were not correctly text-to-speech converted using the initial phonetic tree;

wherein creating the exception dictionary comprises utilizing a set of words removed from the expanded data set by the removing step.

23. The method of claim 18, wherein the acts of claim 15 are performed automatically by at least one machine in accordance with at least one computer program having a plurality of code sections that are executable by the at least one machine, said at least one computer program being stored in a machine readable storage medium.

* * * * *